United States Patent [19]

Röhm

[11] Patent Number: 5,005,453
[45] Date of Patent: Apr. 9, 1991

[54] DRIVE FOR RELATIVELY AXIALLY SHIFTING CHUCK PARTS

[76] Inventor: Günter H. Röhm, Heinrich-Röhm-Strasse 50, D-7927 Sontheim, Fed. Rep. of Germany

[21] Appl. No.: 473,448

[22] Filed: Feb. 1, 1990

[30] Foreign Application Priority Data

Jun. 23, 1989 [DE] Fed. Rep. of Germany ....... 3920612
Nov. 4, 1989 [EP] European Pat. Off. ......... 89120452.1

[51] Int. Cl.$^5$ ............................................. B23B 31/28
[52] U.S. Cl. ...................................... 82/142; 82/132; 82/145; 82/147
[58] Field of Search .................. 82/113, 123, 124, 128, 82/132, 136, 137, 139, 140, 141, 142, 143, 144, 145, 146, 147

[56] References Cited

U.S. PATENT DOCUMENTS

| | | | |
|---|---|---|---|
| 2,947,188 | 8/1960 | Bullard | 82/146 |
| 4,386,544 | 6/1983 | Fuminier | 82/46 |
| 4,411,178 | 10/1983 | Wachs et al. | 82/131 |
| 4,567,794 | 2/1986 | Bald | 82/147 |
| 4,573,379 | 3/1986 | Bald | 82/145 |
| 4,573,380 | 3/1986 | Bald | 82/142 |
| 4,644,819 | 2/1987 | Zugel | 82/142 |

FOREIGN PATENT DOCUMENTS 3218083 11/1983 Fed. Rep. of Germany .
3737190 5/1989 Fed. Rep. of Germany .

*Primary Examiner*—Frederick R. Schmidt
*Assistant Examiner*—Blynn Shideler
*Attorney, Agent, or Firm*—Herbert Dubno; Andrew Wilford

[57] ABSTRACT

A machine tool has a housing normally rotated about a housing axis and a part that is axially movable relative to the housing to adjust the tool. An adjustment apparatus for the tool has a drive having a rotary drive output, a differential transmission having a rotary input connected to the drive output and a pair of transmission outputs. This transmission includes a reverser for rotation of one of the transmission outputs opposite that of the other transmission output. Respective wheels coupled to the transmission outputs are rotatable coaxially on the tool housing and respective screws are rotationally coupled to the wheels, axially fixed on the tool housing, and both threaded in the movable part of the machine tool. According to this invention one of the screws is of opposite hand to the other screw.

11 Claims, 2 Drawing Sheets

DRIVE FOR RELATIVELY AXIALLY SHIFTING CHUCK PARTS

FIELD OF THE INVENTION

The present invention relates to a drive for relatively shifting two rotating elements. More particularly this invention concerns a drive for relatively axially shifting the jaw-actuating member and body of a chuck or the like.

BACKGROUND OF THE INVENTION

In an automated machining operation it is standard practice to bring the workpiece-gripping chuck to a full stop only rarely. Instead between machining operations the rotating chuck is loosened, the workpiece is moved axially in it, and the chuck is tightened on it so that machining can recommence. In such an arrangement it is therefore necessary to provide a drive which can effect the necessary adjustment movements in the chuck regardless of whether it is rotating or not, and without respect to the rotation speed or direction.

This is typically done by providing a drive motor which is stationary and whose rotary output is connected to a rotation-canceling transmission having a pair of oppositely rotating outputs that are connected to respective inputs on the chuck. These inputs in turn are part of a movement-converting unit in the chuck that transforms the opposite rotations of the inputs into the desired type of movement for the chuck.

In German patent document 3,737,190 filed Mar. 11, 1978 by Karl Hiestand the chuck in question has a jaw-actuating member which is rotated in the chuck body in one direction to tighten the chuck and oppositely to loosen it. Accordingly this chuck is provided with two input gears or sprockets constituting the movement-converting inputs connected to the outputs of the rotation-canceling transmission. One of these sprockets is fixed on the chuck body and the other on the rotary jaw-actuating unit. Such an arrangement does not work with a chuck or the like having an axially displaced jaw-adjusting element. The solid connection of the one input sprocket with the chuck body makes the adjustment torque effective on this chuck body, that is an adjustment will tend to work in or against the rotation of the chuck body.

The rotation-canceling transmission is constituted as a two-stage codirectional transmission like a back-gearing transmission having central gears coupled together by two codirectional gears, the shaft rotatable about the central gear being supported dependent on the load on the output member of a torque coupling connected to the output of the adjustment drive motor. This electrical adjustment motor normally is driven in one direction at the same speed so as automatically to rotate the shaft about the main shaft of the back-gear transmission to compensate for the torque transmitted by the clutch and the clamping force.

In German patent document 3,218,083 and U.S. Pat. No. 4,573,379 of Hubert Bald a screw-type transmission is used to convert the input rotary movement into axial movement of the element that actuates the jaws or equivalent structure of the rotating machine tool being adjusted. The motor, once again, rotates continuously so that the tool is adjusted by varying the motor current. Once again the movement conversion involves forces that are applied between the working spindle carrying the machine tool and the part of it being moved so that any adjustment will probably entail some slight increase or decrease in rotational torque of the machine tool. Furthermore to achieve a particular adjustment torque it is necessary to adjust the electric feed to the motor in accordance with what speed the motor is running at and what rate the machine tool is rotating at. Thus it is necessary to use a controller taking into account the motor's operating characteristics and the chuck rotation speed as well as other factors. The result is therefore that this system is quite complex.

OBJECTS OF THE INVENTION

It is therefore an object of the present invention to provide an improved adjustment system for a rotating machine tool.

Another object is the provision of such an improved adjustment system for a rotating machine tool which overcomes the above-given disadvantages, that is which can axially move part of the machine tool without applying torque in one direction or the other to the machine tool itself.

A further object is to provide such an adjustment system which can operate simply, without regard to rotation speed of the chuck.

SUMMARY OF THE INVENTION

The instant invention is an adjustment apparatus used in a machine tool having a housing normally rotated about a housing axis and having a part that is axially movable relative to the housing to adjust the tool. The apparatus has a drive having a rotary drive output, a differential transmission having a rotary input connected to the drive output and a pair of transmission outputs. This transmission includes a reverser for rotation of one of the transmission outputs opposite that of the other transmission output. Respective wheels coupled to the transmission outputs are rotatable coaxially on the tool housing and respective screws are rotationally coupled to the wheels, axially fixed on the tool housing, and both threaded in the movable part of the machine tool. According to this invention one of the screws is of opposite hand to the other screw.

Thus with this arrangement the axially movable part of the machine tool is moved by rotating at least one screw braced between it and the machine-tool housing in one direction and rotating another such screw of opposite hand in the opposite direction. Thus the respective drive wheels will be rotated equally and oppositely so that the resultant torque will zero out; no net torque will be applied to the chuck. In addition the use of a drive/transmission as described, having two oppositely rotating outputs, allows the adjustment to work regardless of the speed or direction of rotation of the chuck so that complex control systems are wholly obviated by the instant invention.

According to a feature of this invention two such screws of one hand are coupled to one of the wheels and are diametrally opposite each other relative to the housing axis and two such screws of the opposite hand are coupled to the other wheel and diametrally opposite each other relative to the housing axis, the screws being generally radially and angularly equispaced from and about the housing axis. Moreover, the part carries a transverse plate in which the screws are threaded and each of the screws is provided with a gear driven directly by the respective wheel and axially fixed on the housing. These wheels are internally toothed and mesh with the gear.

In accordance with further features of this invention the differential transmission comprises a pair of coaxial output bevel gears one of which constitutes one of the transmission outputs, a rotary input member between the bevel gears, an equalizing gear carried on the input member and meshing with the bevel gears, and a reversing gear train connected between the other bevel gear and the other transmission output. The transmission outputs are respective output transmission gears one of which is fixed directly to the one output bevel gear and the other of which is connected via the reversing gear train to the other output bevel gear. In addition the transmission has a housing and both of the transmission output gears are coaxial and carried on the same side of the housing. The transmission includes an input shaft carrying the input member and connected to the drive output and the one transmission output gear is coaxially carried on the input shaft and the other transmission output gear is coaxially carried on the one transmission output gear. Finally the two transmission output gears are of the same diameter as each other, the two bevel gears are of the same diameter as each other, and the wheels are of the same diameter as each other so that the transmission outputs will move identically but oppositely.

The drive means can be a rotating-field motor having a stationary stator and a rotor carrying the drive output. It could also be, for instance, a pinion carried on the transmission input and a rack meshing with the pinion and moved linearly by an actuator like a fluid-powered ram.

DESCRIPTION OF THE DRAWING

The above and other objects, features, and advantages will become more readily apparent from the following, reference being made to the accompanying drawing in which.

SPECIFIC DESCRIPTION

Figure 1:
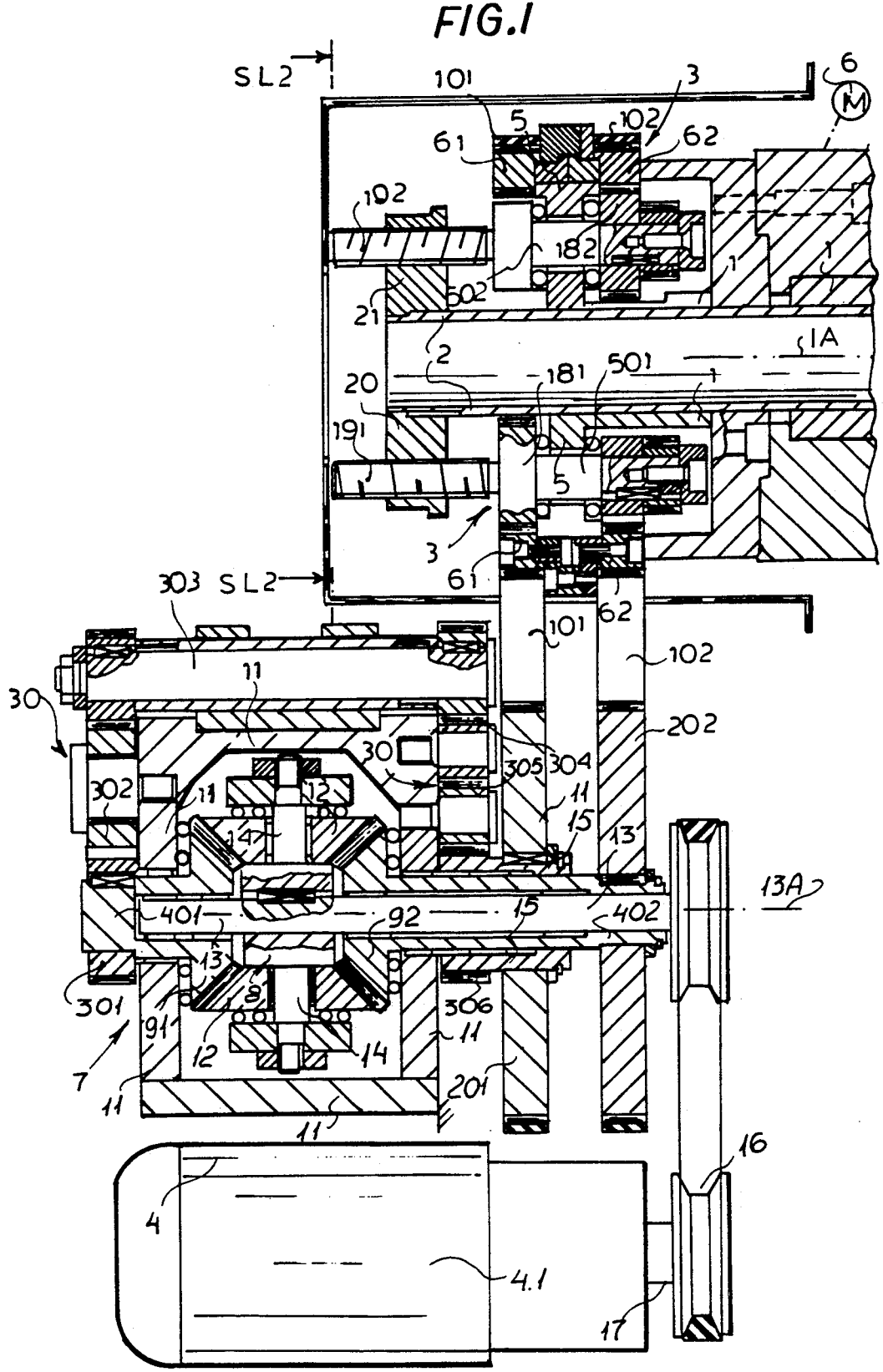
FIG. 1 is an axial section taken along section line SL1 of FIG. 2.
Figure 2:
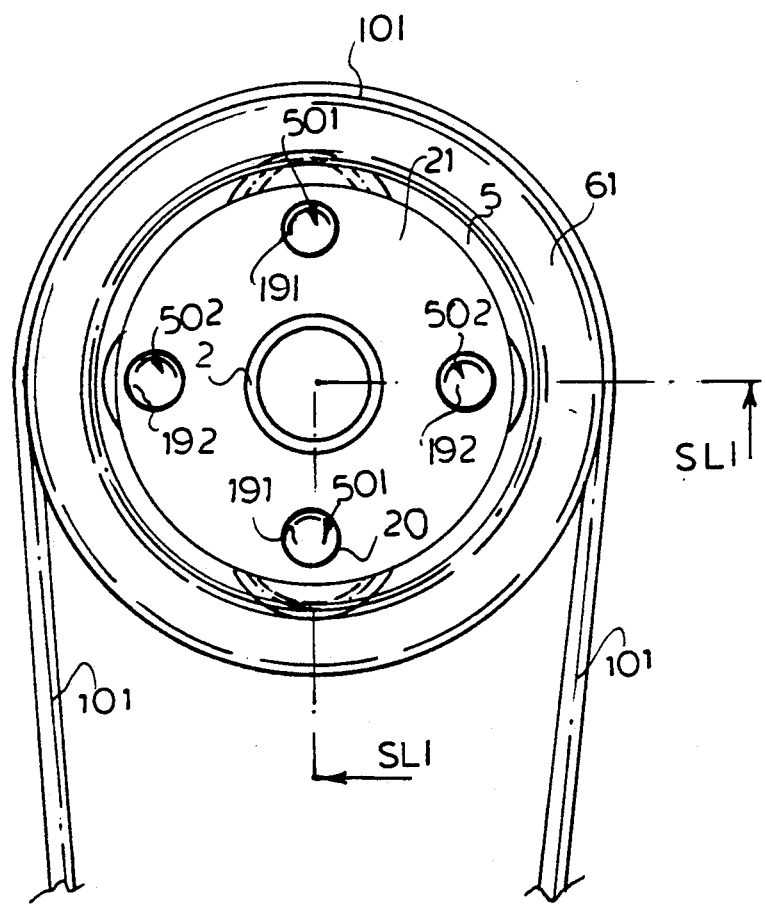
FIG. 2 is a cross section taken along section line SL2 of FIG. 1.

As seen in FIGS. 1 and 2 a machine tool, for instance a chuck, has a housing 1 centered on and normally rotated about an axis 1A by a motor shown schematically at 6. A tubular shaft 2 also centered on the axis 1A is axially displaceable in the housing 1 to adjust the machine tool, here to radially displace unillustrated jaws carried on the housing 1. Axial movement of this shaft part 2 relative to the housing 1 is effected by means of a motion-converting system 3 carried on the housing 1 for rotation therewith about the axis 1A. This system 3 is in turn driven from a stationary differential or rotation-canceling transmission 7 that is itself driven from a stationary drive motor 4.

The motor 4 is of the rotating-field type with a fixed stator 4.1 and a rotary output shaft 17 coupled by a V-belt 16 to an input shaft 13 lying on an axis 13A of the transmission 7. This input shaft 13 carries a transverse input member 8 from which four angularly equispaced stub shafts 14 project, all centered on a plane perpendicular to the axis 13A. Supported by bearings on the input shaft 13 are output bevel gears 91 and 92 that axially flank the input member 8 and that mesh with bevel gears 12 carried on the shafts 14.

The one bevel gear 92 is extended as a tubular output shaft 402 carried on the shaft 13 and carrying an output wheel 202 coupled by a toothed belt 102 to a wheel 62 forming an input of the motion-converting unit 3. The other bevel gear 91 is extended as a stub shaft 401 journaled in a housing 11 of the transmission 7 and carrying an input gear 301 meshing via a gear 302 with a gear at one end of a shaft 303 having a gear at its opposite end meshing via two gears 304 and 305 with an output gear 306 formed on a sleeve 15 journaled on the tubular shaft 402. This sleeve 15 itself carries a wheel 201 identical to the wheel 202 and coupled by a belt 101 to a wheel 61 forming another input of the motion-converting unit 3.

Each of the output gears 91 and 92, the related gears 201 and 202, and the input gears 61 and 62 is of the same effective diameter as its mate so that no speed change is created by the differential 7. In addition the gear train 301-306 serves for reversing rotation of the output wheel 201 relative to the wheel 202 so that, assuming the same load is opposed to rotation of both wheels 201 and 202, rotation of the shaft 13 will be reflected in exactly opposite extents of rotation of the two wheels 201 and 202. Similarly rotation of both of the wheels 201 and 202 synchronously in the same direction will not cause any angular movement of the input shaft 13 at all; instead the gears 12 will simply rotate and the member 8 will be stationary.

The two input wheels 61 and 62 of the motion converter 3 are rotatable about the axis 1A on the housing 1 but are axially fixed on a flange 5 fixed thereon. The wheel 61 meshes with two diametrally opposed gears 181 carried on respective shafts 501 that also carry respective screws 191 and the wheel 62 meshes with two diametrally opposed gears 182 carried on respective shafts 502 that also carry respective screws 192. The four screws 191 and 192 are angularly equispaced about the axis 1A and are all threaded into a plate 21 fixed on the end of the axially movable tube shaft 2.

According to this invention the screws 191 are of opposite hand to the screws 192. Thus, whether the housing 1 is rotating at any speed in either direction about its axis 1A, when the input shaft 13 is moved angularly the wheels 401 and 402 and, with them, the wheels 61 and 62 will be rotated identically but in opposite directions to rotate the screws 191 in one direction and the screws 192 in the opposite direction. The result will be an appropriate axial shifting of the plate 21 and the shaft 2 in one axial direction or the other.

Thus with this system the elements, here the screws 191 and 192, that relatively shift the housing 1 and shaft 2 are braced directly axially between these two parts, but are actuated symmetrically oppositely. Two opposite and equal torques are applied to the machine tool 1, 2 that completely cancel each other out. In addition the adjustment system of this invention functions regardless whether the chuck is rotating or stationary, and the motor output 17 is only rotated for an adjustment operation. As a result no complicated condition-monitoring control system need be used and the drive 4 can be of very simple construction, for instance a stepping motor or even a rack-and-pinion setup with the rack driven by a linear actuator such as a hydraulic ram.

I claim:

1. In combination with a machine tool having a housing normally rotated about a housing axis and having a part that is axially movable relative to the housing to adjust the tool, an adjustment apparatus for relatively axially displacing the housing and the part of the tool, the apparatus comprising:

drive means having two oppositely rotating drive outputs;

two respective wheels coupled to the drive outputs and rotatable coaxially on the tool housing; and two respective axially extending screws rotationally coupled to the respective wheels, axially fixed on the tool housing, and both threaded axially in the movable part of the machine tool, one of the screws having a screwthread of a predetermined hand and the other of the screws having a screwthread of opposite hand.

2. The machine-tool adjustment apparatus defined in claim 1 wherein two such screws having screwthreads of the predetermined hand are coupled to one of the wheels and are diametrally opposite each other relative to the housing axis and two such screws having screwthreads of the opposite hand are coupled to the other wheel and are diametrally opposite each other relative to the housing axis, all four screws being generally radially and angularly equispaced from and about the housing axis.

3. The machine-tool adjustment apparatus defined in claim 1 wherein the part carries a transverse plate in which the screws are all threaded, each of the screws being provided with a gear driven directly by the respective wheel and axially fixed on the housing.

4. The machine-tool adjustment apparatus defined in claim 3 wherein the wheels are internally toothed and mesh with the respective gears.

5. In combination with a machine tool having a housing normally rotated about a housing axis and having a part that is axially movable relative to the housing to adjust the tool, an adjustment apparatus for relatively axially displacing the housing and the part of the tool, the apparatus comprising:

drive means having two oppositely rotating drive outputs, the drive means being a differential transmission including
  a drive motor having a rotary output,
  a pair of coaxial output bevel gears one of which constitutes one of the drive outputs,
  a rotary input member between the bevel gears and connected to the drive-motor rotary output,
  an equalizing gear carried on the input member and meshing with the bevel gears, and
  a reversing gear train connected between the other bevel gear and the other drive output;

two respective wheels coupled to the drive outputs and rotatable coaxially on the tool housing; and two respective screws rotationally coupled to the wheels, axially fixed on the tool housing, and both threaded in the movable part of the machine tool, one of the screws having a screwthread of a predetermined hand and the other of the screws having a screwthread of opposite hand.

6. The machine-tool adjustment apparatus defined in claim 5 wherein the drive outputs ar respective output transmission gears one of which is fixed directly to the one output bevel gear and the other of which is connected via the reversing gear train to the other output bevel gear.

7. The machine-tool adjustment apparatus defined in claim 6 wherein the transmission has a housing and both of the transmission output gears are coaxial and carried on the same side of the housing.

8. The machine-tool adjustment apparatus defined in claim 7 wherein the transmission includes an input shaft carrying the input member and connected to the rotary drive-motor output, the one transmission output gear being coaxially carried on the input shaft and the other transmission output gear being coaxially carried on the one transmission output gear.

9. The machine-tool adjustment apparatus defined in claim 7 wherein the two transmission output gears are of the same diameter as each other, the two bevel gears are of the same diameter as each other, and the wheels are of the same diameter as each other.

10. The machine-tool adjustment apparatus defined in claim 5 wherein the motor is a rotating-field motor having a stationary stator and a rotor carrying the rotary output.

11. In combination with a machine tool having a housing normally rotated about a housing axis and having a part that is axially movable relative to the housing to adjust the tool, an adjustment apparatus for relatively axially displacing the part and the housing, the apparatus comprising:

drive means having a rotary drive output;

a differential transmission having a rotary input connected to the drive output and two transmission outputs, the differential transmission including reversing means for rotation of one of the transmission outputs opposite that of the other transmission output;

two respective wheels coupled to the transmission outputs and rotatable coaxially on the tool housing; and two respective axially extending screws rotationally coupled to the wheels, axially fixed on the tool housing, and both threaded axially in the movable part of the machine tool, one of the screws having a screwthread of a predetermined hand and the other screw having a screwthread of opposite hand.

* * * * *